USOO5558513A

United States Patent [19]
Wentworth, Jr.

[11] Patent Number: 5,558,513
[45] Date of Patent: Sep. 24, 1996

[54] VAPOR CATALYST SYSTEM FOR COMBUSTION

[75] Inventor: Fred A. Wentworth, Jr., Stratham, N.H.

[73] Assignee: Ionic Fuel Technology, Inc., Wilmington, Del.

[21] Appl. No.: 719,343

[22] Filed: Aug. 31, 1976

Related U.S. Application Data

[63] Continuation-in-part of Ser. No. 515,527, Oct. 17, 1994, Pat. No. 4,016,837, which is a continuation-in-part of Ser. No. 430,252, Jan. 2, 1974, Pat. No. 3,862,819.

[51] Int. Cl.$^6$ ........................................................ F23J 7/00
[52] U.S. Cl. ............................ 431/4; 431/190; 123/25 A; 123/25 P
[58] Field of Search ...................... 431/4, 190; 123/25 R, 123/25 A, 25 P

[56] References Cited

U.S. PATENT DOCUMENTS

| | | | |
|---|---|---|---|
| 3,860,384 | 1/1975 | Vulliet et al. | 431/4 |
| 3,862,819 | 1/1975 | Wentworth et al. | 431/4 |
| 4,014,637 | 3/1977 | Schena | 431/4 |
| 4,152,374 | 5/1979 | Wenger et al. | 431/4 X |
| 4,173,450 | 11/1979 | Schrank | 123/25 R X |

*Primary Examiner*—Noah P. Kamen
*Attorney, Agent, or Firm*—Hayes, Soloway, Hennessey, Grossman & Hage, P.C.

[57] ABSTRACT

A system including a water container, a compressor, a pressure line connected from the compressor to the water container to bubble air through water in the container, a suction line taking air back to the compressor for recirculation, and a connection to the air intake of a combustion device for injecting some of the recirculating air into the intake air stream of the combustion device.

14 Claims, 1 Drawing Sheet

VAPOR CATALYST SYSTEM FOR COMBUSTION

CROSS REFERENCE TO RELATED APPLICATIONS

The present application is a continuation in part of my prior pending application Ser. No. 515,527, filed Oct. 17, 1974, entitled *Vapor Intake System to Internal Combustion Engines*, U.S. Pat. No. 4,016,836 which in turn is a continuation in part of my application Ser. No. 430,252, filed Jan. 2, 1974, entitled *Fuel Catalyzer*, now issued as U.S. Pat. No. 3,862,819.

BACKGROUND OF THE INVENTION

1. Field of the Invention

The present invention relates to energy boosters for fossil fuel combustion systems and in particular to such boosters providing controlled water vapor content.

2. Description of the Prior Art

It is well known that high humidity can improve the performance of an internal combustion engine. Various water injectors have been marketed with allegations of improved economy and performance for automobile engines. Commercial oil burners have long utilized steam to atomize oil for improved combustion.

In all of these arrangements, any additional energy produced must be due either to energy conversion from the additional mass provided or energy due to a more efficient or complete conversion of the fossil fuel. With water as the agent, either of these is possible and some combination is probable in most cases. Mostly, substantial quantities of moisture addition have been used in automotive engines. The cost of accessory equipment has apparently been a deterrent in home heating service.

It is also known that water vapor can act as a catalyzer for combustion. See Van Nostrand's Scientific Encyclopedia, fourth edition, page 1501. Useful implementation of this phenomenon is strangely lacking in most commercial production off combustion devices.

SUMMARY OF THE INVENTION

In accordance with the invention, air space above water in a container of water is connected to the air intake of a combustion device and a second connection is made from below the water surface in said container to a positive pressure source. In addition to the connection to the combustion device, the air space in the container of water is connected to the suction side of the positive pressure source such that a portion of the air supplied below the water surface in said container continuously recirculates through the positive pressure source.

A nonmiscible supernatant liquid layer is used over the water as a barrier to prevent reabsorption of moisture drawn from the water. The connections are made of a size and/or control valves are utilized to maintain the recirculating air at a substantially higher flow level than the air passed on to the combustion device.

Thus it is an object of the invention to provide a novel vapor catalyst method for combustion devices in which air is circulated continuously in a loop through water with at least some amount of the flow entering from ambient air and exiting to the combustion device.

It is a further object of the invention to provide a vapor catalyst apparatus for combustion devices in which an air compressor is interconnected with a container of water to continuously recycle air that is bubbled through the water and having an inlet air connector and an outlet air connector in which the outlet air connector is connected to the intake of the combustion device so as to provide a relatively small amount of air to the combustion device relative to the air recirculating between the water container and compressor.

Further objects and features of the invention will become apparent upon reading the following description together with the Drawing.

DESCRIPTION OF THE PREFERRED EMBODIMENTS

Figure 1:
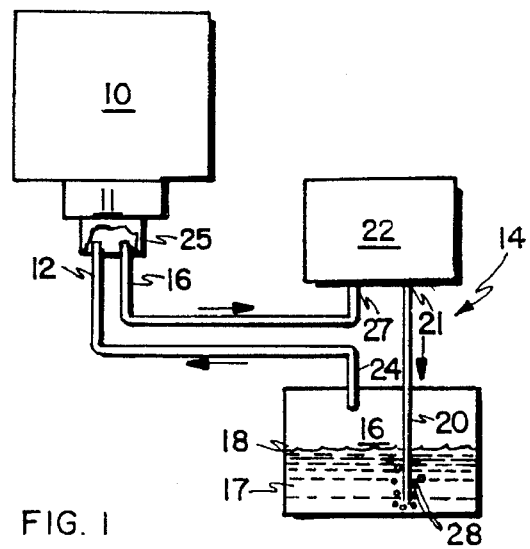
FIG. 1 is a simplified block diagram of a vapor catalyst system according to one aspect of the invention.

In block diagram of FIG. 1, combustion device 10 has air intake 11 into which controlled vapor air outlet 12 is provided by vapor catalyst system 14. Vapor catalyst system 14 has liquid container 16 partially filled with water 17 and a supernatant layer of nonmiscible fluid 18. While synthetic oil has been used for layer 18, other liquids that are nonmiscible with water may be utilized. The function of layer 18 is to prevent absorptive transfer of moisture or other constituents between water 17 and the space at the top of container 16. Layer 18 should have a low volatility so that it will not be carried off by the outgoing air. Pipe 20 provides air under pressure from pressure side 21 of pump 22 to below tile surface of water 17. Outlet connection 24 from the top of container 16 is connected to mixing chamber 25 which in turn has a connection 26 back to suction side 27 of air pump 22. Thus pump 22 provides a low pressure at the tom of container 16 by connection 24 and a pressure at the outlet of pipe 20 resulting in air bubbles 28 passing upward through water 17 and layer 18. Operation of pump 22 continuously recirculates air through the water in container 16 and back to the pump via mixing chamber 25 resulting in a stable content of water vapor in the recirculating air and in mixing chamber 25. Outlet connection 12 is connected by mixing chamber 25 to air intake 11 of combustion device 10. The amount of air carrying water vapor as a catalyst introduced at intake 11 is controlled by the relationship of outlet 12 to connection 26 and the amount of isolation between them and the main combustion air intake. The remainder of the air flow provided by pump 22 merely recirculates, the recirculation rate being kept high enough so that the amount of new air taken in at suction side 27 or its humidity content does not produce variations in the humidity content of the air in chamber 25.

Figure 2:
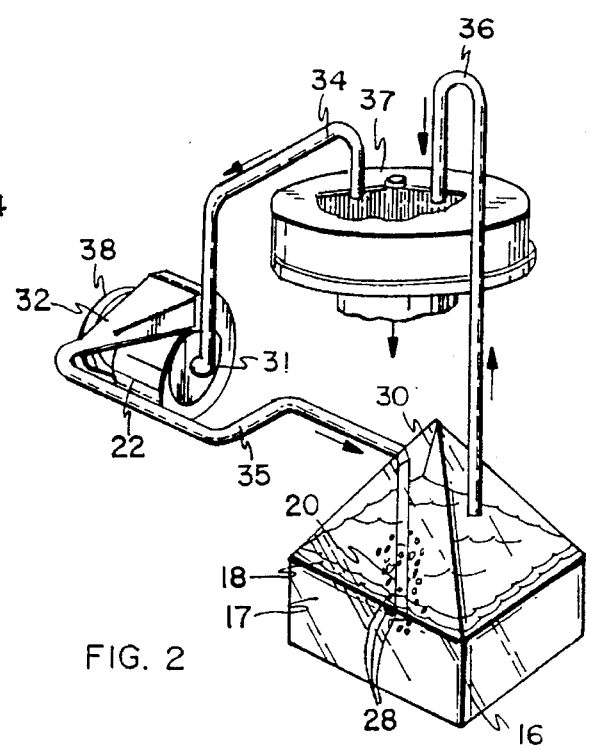
FIG. 2 is a diagrammatic illustration of a first embodiment of a vapor catalyst system in accordance with the aspect of FIG. 1.

FIG. 2 illustrates a pyramidal top 30 of container 16 and also, by cut-away, the relationship of hose connections 34 and 36 to the air filter intake 37 of an internal combustion engine. Air pump 22 is depicted as driven by pulley 38 designed for operation by an engine fan belt. Both intake 31 and exhaust 32 of pump 22 are sealed except for the connections of hose 34 and hose 35 respectively. Hose 34 is connected to air filter intake 37 to draw air from inside the air filter. Hose 35 is for connection to provide air pressure from pump 22 to pipe 20 in container 16 and hose 36 is for connection from pyramidal top 30 to exhaust vapor laden air to the inside of air filter intake 37. In the arrangement of FIG. 2, there are no specific critical sizes or pressures; however, the system must be designed to provide a slow but steady stream of bubbles 28 at idling speed for the engine. By locating hoses 34 and 36 symmetrically, in their connection to intake 22, the effects of engine vacuum are balanced out and interchange will occur between hoses 34 and 36.

Thus in the arrangement of FIG. 2, air filter intake 37 provides the function of mixing chamber 25 with some continuous recirculation through pump 22 and some fresh air being fed into pump 22 and some other vapor laden air being taken off into the combustion intake. While pump 22 is depicted as driven directly by an engine fan belt, it may be an electrically driven pump. The apparatus depicted in FIG. 2 provides control over the amount of air passed through the vapor catalyst system and on into the combustion intake relative to the amount of air that is recirculated within the vapor catalyst system only by the positioning of hoses 34 and 36. Additional control is readily provided by baffles or other means of partially isolating hoses 34 and 36 from the combustion air intake. Total flow through pump 22 can be controlled by a valve in any one of hoses 34, 35 and 36.

Figure 3:
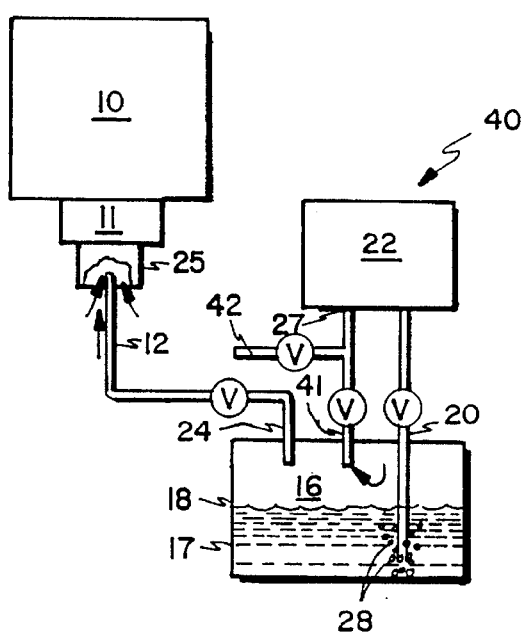
FIG. 3 is a simplified block diagram of a vapor catalyst system according to a second aspect of the invention.

In the block diagram of FIG. 3, the new air intake is directly from ambient air, and vapor catalyst system 40 has only single connection 12 to a chamber 25 of combustion device 10. Pipe 41 connects the top of container 16 to suction side 27 of pump 22, and new air is brought into suction side 27 through inlet pipe 42. Pressure pipe 20 remains the same as does the remainder of the vapor catalyst system. Control of through air relative to recirculated air is obtained by constricting the air inlet 42 or the air outlet 12.

In the system of FIG. 3, the outlet air to combustion device 10 must equal the inlet air at inlet 42 and is completely independent of the volume and flow rate of recirculated air. This provides more precise control than in the system of FIG. 1. The airspace in the top of container 16 and the airspace inside pump 22 serve as a chamber of constant vapor content. As long as the flow of air recirculated is kept high compared to the flow of air passed through to the combustion device 10, the vapor content of the flow to combustion device 10 will be relatively independent of the vapor content of incoming air at inlet 42.

Figure 4:
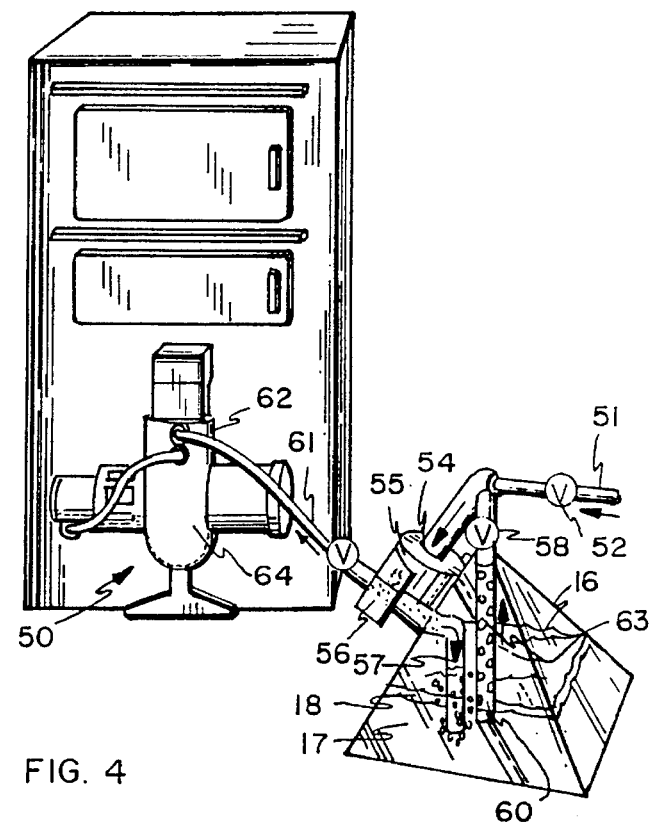
FIG. 4 is a diagrammatic illustration of a second embodiment of a vapor catalyst system in accordance with the aspect of FIG. 3.

The invention aspect of FIG. 3 is shown in conjunction with an oil furnace combustion device 50 in FIG. 4. Thus FIG. 4 has an air inlet 51 controlled by valve 52 and going to the suction side 54 of pump 55. Pressure side 56 of pump 55 is connected by pipe 57 to a point below the surface of water 17 in container 16. Suction pipe 60 extends from suction side 54 of pump 55 through valve 58 to the bottom of container 16. However, suction pipe 60 is perforated by perforations 63 in the airspace above water 17 so that air is drawn into pipe 60 rather than water. An additional connection to pressure side 56 of pump 55 is hose 61. Hose 61 connects to a low pressure point 62 in intake compressor 64 of combustion device 50. As can be seen in FIG. 4, pipes 57 and 60 providing recirculation between container 16 and pump 55 are larger than pipe 51 providing the air inlet and pipe 61 connecting outlet air to compressor 64. Further control is provided by valves 52 and 58 to regulate the amount of air flow in the two paths. While an additional mixing chamber can be added, the space in the housing of pump 55 and in the top of container 16 serves the function of the mixing chamber. In operation, control 58 is adjusted to provide a constant relative humidity condition at outlet side 56 of pump 55, and control 52 is adjusted to provide maximum combustion efficiency in combustion device 50 as determined by conventional testing apparatus. It has been found that these adjustments provide a substantially greater recirculation flow between pump 55 and container 16 than the flow through pipe 51 and hose 61.

While the invention has been described with respect to specific embodiments it is to be understood that the continuous recirculation of vapor laden air is critical and the sizes, shapes, materials and relative positions of container 16, pumps 22 and 55, the valves and connections are subject to obvious variations.

Thus, for example, while pump 22 is depicted as a centrifugal type it can just as readily be a reciprocating pump, piston driven or bellows type. The rubber bellows type of pump commonly found on household aquariums has been found satisfactory.

Accordingly, it is the intention to cover the invention as set forth in the scope of the appended claims.

I claim:

1. A vapor catalyst system for fossil fuel combustion apparatus comprising:

(a) a closed container of liquid constituted at least partially of water;

(b) an air pump having a pressure side and a suction side;

(c) a first connection from the pressure side of said pump to below the liquid surface in said container;

(d) a second connection from the suction side of said pump directly to said container at a location above the liquid surface in said container to produce continuously circulating air flow between said pump and said container passing through said liquid;

(e) a third connection to the suction side of said pump from ambient air; and, (f) means to exhaust recirculating air to said combustion apparatus while replacing said recirculating air with ambient air;

and wherein, said air pump and means to exhaust are adapted to permit a substantially fixed volume of said recirculating air to be maintained at said location above the liquid surface and also to permit the amount of air exhausted to said combustion device to be small relative to air recirculated between said pump and said container.

2. A vapor catalyst system according to claim 1 wherein said means to exhaust is a conduit including a first control valve, and one of said first and second connections is a second conduit including a second control valve whereby operation of said first and second control valves will regulate the circulating air flow between said pump and said container relative to flow through said means to exhaust.

3. A vapor catalyst system according to claim 2 wherein said second connection comprises a perforated conduit extending from the bottom to the top of said container and a non-perforated conduit extending from the top of said container to the suction side of said pump.

4. A vapor catalyst method for controlled mixing of a vapor catalyst into the air intake of a fossil fuel combustion apparatus comprising:

(a) continuously circulating air from a pressure source through a body of water and back to said pressure source;

(b) retaining a fixed volume of said recirculating air in a space connected in the circulation path;

(c) connecting a point in the recirculating path of said air at a pressure side of said pressure source to the air intake of combustion apparatus;

(d) admitting ambient air to the path of said recirculating air in a controlled amount at a suction side of said pressure source; and, (e) controlling the admission of air so that air passed to the intake of said combustion device is small relative to air circulated in the path between said pressure source and said body of water.

5. A method according to claim 4, wherein said circulation of air comprises feeding air through a gas impelling device, diverting part of the output air from said gas impelling device to a dip tube which extends beneath the surface of said water, bubbling said air through said water, feeding said bubbled air to the gas impelling device, and feeding the non-diverted part of the output air from said gas impelling device into the combustion apparatus.

6. An apparatus for improving combustion efficiency, and comprising:

a. a container for holding a quantity of water-including liquid;

b. means for extracting a combustion-improving catalyst from said liquid;

c. means for withdrawing air containing said catalyst from a space above said liquid in said container to a separate location;

d. means for controllably recirculating a portion of said air withdrawn from said apparatus to said space, said recirculating means being adapted to substantially maintain a fixed volume of air in said space in said container; and e. means for supplying said container with ambient air, said supplying means being adapted so that air withdrawn to said separate location is small relative to said portion of air recirculated to said space.

7. An apparatus according to claim 6, wherein said circulating means comprises means for bubbling said portion of vapor through said water.

8. An apparatus for improving efficiency of a fossil fuel combuster device, and comprising:

a. means for continuously circulating air from a pressure source through a body of water and back to said pressure source;

b. means for retaining a substantially fixed volume of said recirculating air in a space above said water connected in said circulation path;

c. means for connecting a point in the recirculating path of said air at a pressure side of said pressure source to the air intake of said combustion device;

d. means for admitting ambient air to the path of said recirculating air in a controlled amount at a suction side of said pressure source; and, e. means for controlling the admission of air so that air passed to said combustion device is small relative to air circulated in the path between said pressure source and said water.

9. The apparatus of claim 8, wherein said means for circulating air comprises a tube which extends below the water, said tube having a discharge opening which is sized to provide bubbles therefrom.

10. The apparatus of claim 8, wherein said liquid fuel combustion device is an oil burner.

11. The apparatus of claim 8, wherein said pressure source comprises a blower.

12. The apparatus of claim 8, wherein said pressure source comprises a compressor.

13. A vapor catalyst system for fossil fuel combustion apparatus comprising:

a. a closed container of liquid constituted at least partially of water;

b. an air pump having a pressure side and a suction side;

c. a first connection from the pressure side of said pump to below the liquid surface in said container;

d. a second connection from the suction side of said pump directly to said container to produce continuously circulating air flow between said pump and said container passing through said liquid;

e. a third connection to the suction side of said pump from ambient air; and, f. means to exhaust recirculating air to said combustion apparatus while replacing said recirculating air from ambient air;

and wherein, said said means to exhaust includes a conduit having a first control valve, and one of said first and second connections is a second conduit including a second control valve whereby operation of said first and second control valves regulates circulating air flow between said pump and said container relative to flow through said means to exhaust.

14. A vapor catalyst system according to claim 13, wherein said second connection comprises a perforated conduit extending from the bottom to the top of said container and a non-perforated conduit extending from the top of said container to the suction side of said pump.

* * * * *